United States Patent [19]

Sakai et al.

[11] 4,352,617

[45] Oct. 5, 1982

[54] BUCKET STACKING AND CONVEYING APPARATUS

[75] Inventors: Masao Sakai, Inuyamashi; Takayuki Nishida, Kyotoshi, both of Japan

[73] Assignee: Murata Kikai Kabushiki Kaisha, Japan

[21] Appl. No.: 138,876

[22] Filed: Apr. 10, 1980

[30] Foreign Application Priority Data

Apr. 12, 1979 [JP] Japan .................................. 54-45048
Apr. 24, 1979 [JP] Japan .................................. 54-50983

[51] Int. Cl.³ ............................................ B65G 57/30
[52] U.S. Cl. ....................................... 414/95; 414/127
[58] Field of Search .................. 414/95, 127; 221/295, 221/297

[56] References Cited

U.S. PATENT DOCUMENTS

| | | | |
|---|---|---|---|
| 2,744,372 | 5/1956 | Cleaveland et al. ................ | 198/343 |
| 3,013,680 | 12/1961 | Paxton ............................ | 414/127 X |
| 3,190,466 | 6/1965 | Hostetler ......................... | 414/95 X |
| 3,363,781 | 1/1968 | Magnetti ......................... | 414/95 |
| 3,370,724 | 2/1968 | Burns et al. ..................... | 414/127 X |

FOREIGN PATENT DOCUMENTS 1061861 3/1967 United Kingdom .................. 414/95

*Primary Examiner*—Leslie J. Paperner
*Attorney, Agent, or Firm*—Whittemore, Hulbert & Belknap

[57] ABSTRACT

An apparatus for stacking buckets in order which are carried by a conveyor and an apparatus for conveying the stacked buckets in section. The apparatus comprises stanchions disposed vertically on both the side portions of a conveyor, a supporting member capable of moving in the vertical direction along the stanchions which supports a bucket-engaging hook lever and driving means for the supporting member.

5 Claims, 7 Drawing Figures

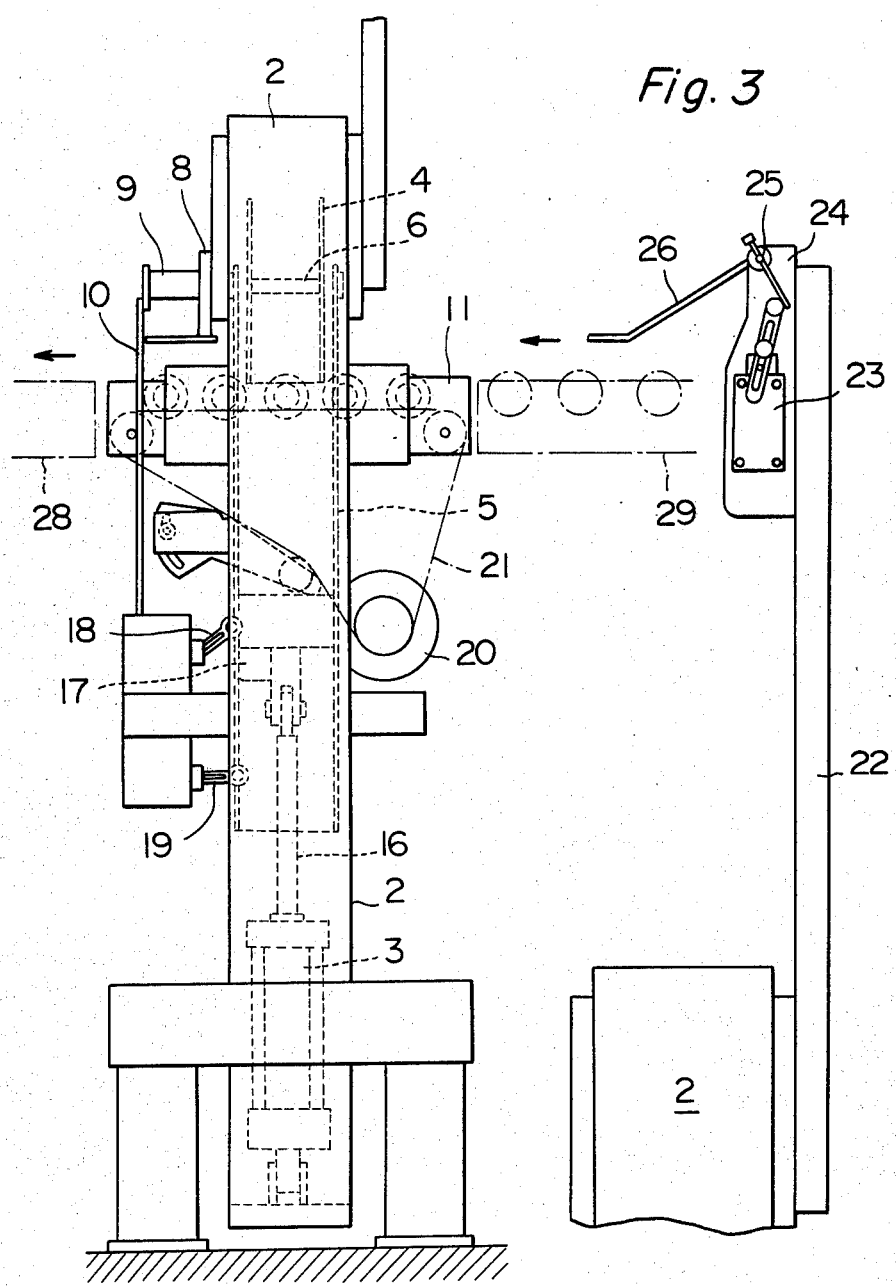

BUCKET STACKING AND CONVEYING APPARATUS

SUMMARY OF THE INVENTION

The present invention relates to an apparatus for stacking buckets, which have been conveyed independently, in a plurality of stages on a conveyor and also relates to an apparatus for conveying stacked buckets in section.

An object of the present invention is to provide an apparatus for stacking buckets and an apparatus for separating one of the stacked buckets and conveying in section having a very simple structure without using a complicated gripping mechanism.

Another object of the present invention is to provide a bucket stacking apparatus in which a bucket is once lifted up, a subsequent bucket is located below said bucket, the lifted bucket is brought down, all the buckets are then lifted up, a still subsequent bucket is located below the lowermost lifted bucket, the lifted buckets are then brought down, and buckets are thus stacked one by one.

Still another object of the present invention is to provide an apparatus for conveying stacked buckets in section, in which buckets carried in the state stacked in a plurality of stages are stopped at a predetermined position and they are delivered out in succession from the lowermost bucket.

According to the present invention, conveyed buckets can be stacked one by one on the conveyor or one bucket can be separated from the stacked buckets to be conveyed in section only by means of the vertical movement of a lift stand which is disposed under a bucket-carrying conveyor.

BRIEF DESCRIPTION OF THE DRAWINGS

FIG. 2 is a side view showing the apparatus illustrated in FIG. 1;

FIG. 3 is a side view showing a part of the apparatus illustrated in FIG. 1;

DETAILED DESCRIPTION OF THE INVENTION

The apparatus of the present invention will now be described with reference to the accompanying drawings.

Figure 1:
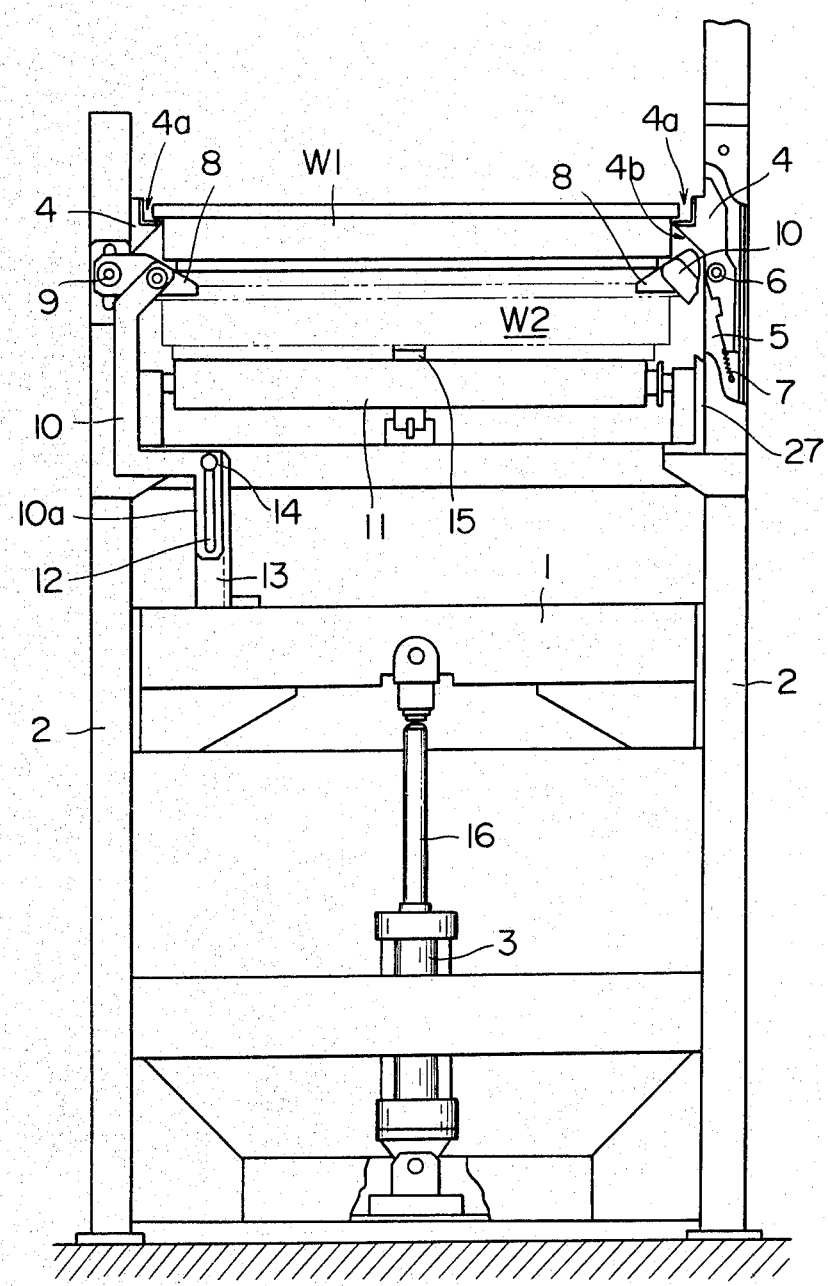
FIG. 1 is a partially cutaway front view diagrammatically illustrating the structure one embodiment of the present invention.

Referring to FIG. 1, a lift stand 1 is moved in the vertical direction along stanchions 2 by a fluid cylinder 3 as a driving source, and a supporting member 5 having a hook lever 4 described hereinafter is fixed to the lift stand 1, so that the supporting member 5 is moved in the vertical direction together with the lift stand 1. Hook levers 4 are supported on the supporting member 5 through a shaft 6. Each hook lever 4 has a bucket-engaging hook 4a and a cam face 4b, and one end of a spring 7 is connected to the lower end of the hook lever 4. The other end of the spring 7 is connected to the supporting member 5, so that the hook lever 4 is always urged counterclockwise with the shaft 6 being as the center.

Stoppers 8 are mounted on the stanchions 2 through a shaft 9. Each stopper 8 is connected to the top end of a bent lever 10, so that the stopper 8 turns with the shaft 9 being as the center by the vertical movement of the lever 10 and projects above or is drawn down from a conveyor 11.

A long hole 12 is formed on the lower vertical portion 10a of the bent lever 10, and a pin 14 of a supporting plate 13 fixed to the lift stand 1 is freely fitted in this long hole 12. A load detector 15 is disposed to rise above and sink below the roller conveyor 11 and it detects whether or not a bucket is present on the conveyor 11.

Referring to FIG. 2, a dog 17 is mounted on the lift stand 1 connected to a piston rod 16 of the fluid cylinder 3 and the dog 17 is engaged with limit switches 18 and 19 fixed to the stanchion 2 to set the upper limit and lower limit stop positions for the supporting member 5. A driving motor 20 is disposed to drive the roller conveyor 11 through a chain 21.

FIG. 3 illustrates switch means disposed in the upper portion of the stanchion 2 to detect the height of the stacked buckets. Referring to FIG. 3, a limit switch 23 is mounted on the end portion of a supporting member 22 extended upwardly from the stanchion 2. When a bucket sensing piece 26 having a substantially L-figured shape and being supported on a supporting plate 24 through a shaft 25 is pushed up by a bucket and is turned clockwise with the shaft 25 being as the fulcrum, the end portion of the L-shaped sensing piece 26 kicks the limit switch 23, whereby stacking of a predetermined number of buckets is detected.

The bucket stacking operation in the stacking apparatus having the above-mentioned structure will now be described.

Figure 4:
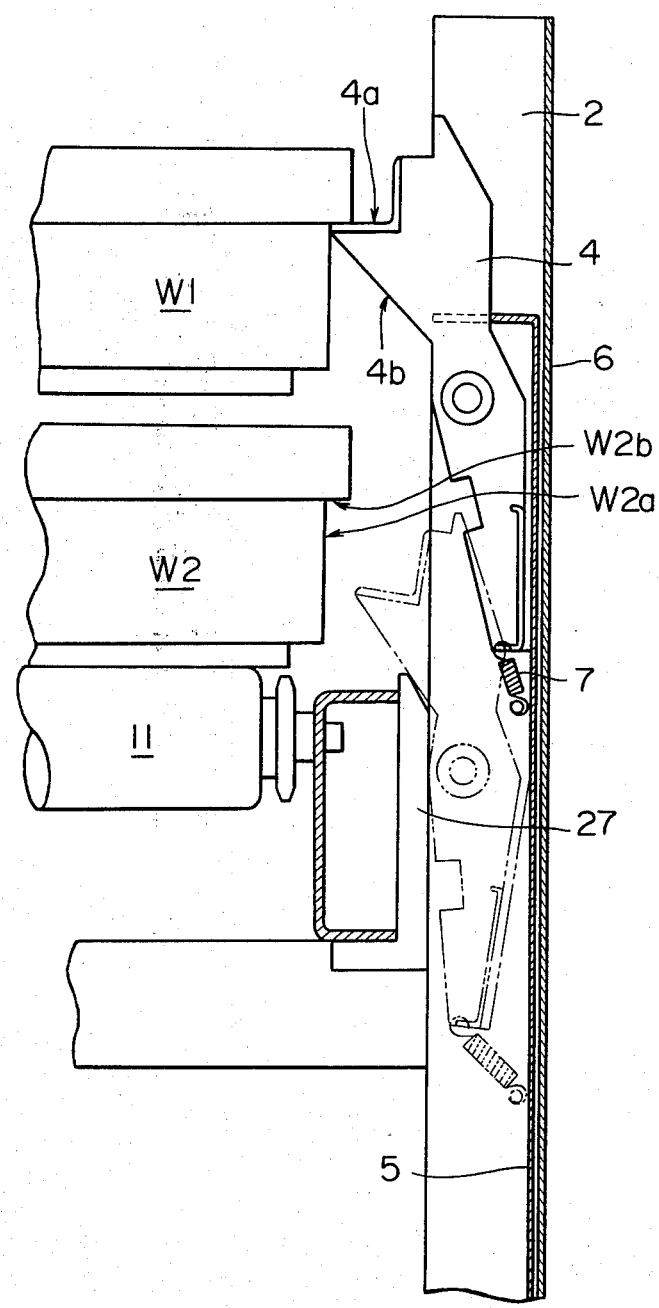
FIG. 4 is a diagram illustrating the operation of the hook lever in a first embodiment.

Referring to FIGS. 1 and 4, while a bucket W1 is lifted up, the lift stand 1 is at an upper limit position and the stoppers 8 project on the side of the roller conveyor to set a subsequent bucket W2 at a predetermined position. When receipt of the bucket is detected by the detector 15, the lift stand 1 is brought down and therefore, also the hook levers 4 are brought down to the lower limit position. At this point, the lifted bucket W1 is placed on the new bucket W2. With further downward movement of the lift stand 1, as shown in FIG. 4, the cam face 4b of the hook lever 4 is allowed to fall in engagement with the stop plate 27 fixed to the stanchion 2, and the hook lever 4 is turned against the spring 7 with the shaft 6 being as the center and stopped at a position indicated by a two-dot chain line. Then, the limit switch 19 indicating the lower limit position is put on and advance of the piston rod 16 is started again. Thus, with upward movement of the lift stand 1, the hook lever 4 is raised up and when the cam face 4b is thus disengaged from the stop plate 27, the hook lever 4 is turned counterclockwise with the shaft 6 being as the center by the spring 7 and impinges against the side face W2a of the bucket W2. The hook lever 4 is further elevated and falls in engagement with the engaging face W2b of the bucket W2. Accordingly, the hook lever 4 lifts up both the new bucket W2 and the upper bucket W1, and the hook lever 4 is elevated to a position indicated by a solid line and puts on the limit switch 18 indicating the upper limit position, whereby the hook lever 4 is stopped.

While a bucket is lifted up and located at the upper limit position, the stoppers 8 mounted on the stanchions 5 are located at positions blocking the carried bucket as shown in FIG. 1, but when the lift stand 1 is brought down, the lever 10 is not caused to operate before the pin 14 arrives at the lower end of the long hole 12 of the lever 10. More specifically, since the stopper 8 is pressed by the bucket W2, only the pin 14 is brought down in the long hole 12, and when the pin 14 arrives at the lower end of the long hole 12 and the lift stand 1 is further brought down, the lever 10 falls in engagement with the pin 14 and also the lever 10 is brought down for the first time. By this downward movement of the lever 10, the stopper 8 connected to the lever 10 is turned clockwise with the shaft 9 being as the center, and when the lift stand 1 arrives at the lower limit position, the stopper 8 is released from engagement with the bucket W2 and is retreated from the roller conveyor 11.

In the above-mentioned manner, buckets delivered by the conveyor 29 and carried onto the conveyor 11 are gradually stacked, and when they are stacked to a predetermined height, the top end portion of the uppermost bucket pushes up the sensing piece 26 disposed in the upper portion of the stanchion 2 as shown in FIG. 3, whereby the limit switch 23 is put on and stacking of buckets to a predetermined height is detected, and the stacked buckets are brought down on the roller conveyor 11. Simultaneously, the motor 20 shown in FIG. 2 is driven and the conveyor 11 is rotated through the chain 21, and the stacked buckets are delivered onto a delivery conveyor 28.

As will be apparent from the foregoing illustration, according to the first embodiment of the present invention, a bucket-engaging hook lever is supported in the spring-urged state on a lift stand capable of moving in the vertical direction along stanchions disposed vertically on both the side portions of a bucket-carrying conveyor, and this hook lever is arranged so that while the lift stand is lifted up, the hook lever is caused to fall into engagement with a lowermost bucket and lift up all the stacked buckets, a subsequent bucket is guided and set below the lowermost bucket while blocking this new bucket by the stopper connected to the lift stand, and when the lift stand is brought down, the buckets lifted up are placed on this new bucket.

According to a second embodiment of the present invention, buckets carried in the state stacked in a plurality of stages are stopped at a predetermined position and they are delivered out in succession from the lowermost bucket.

The apparatus will now be described with reference to FIGS. 5 to 7.

Figure 5:
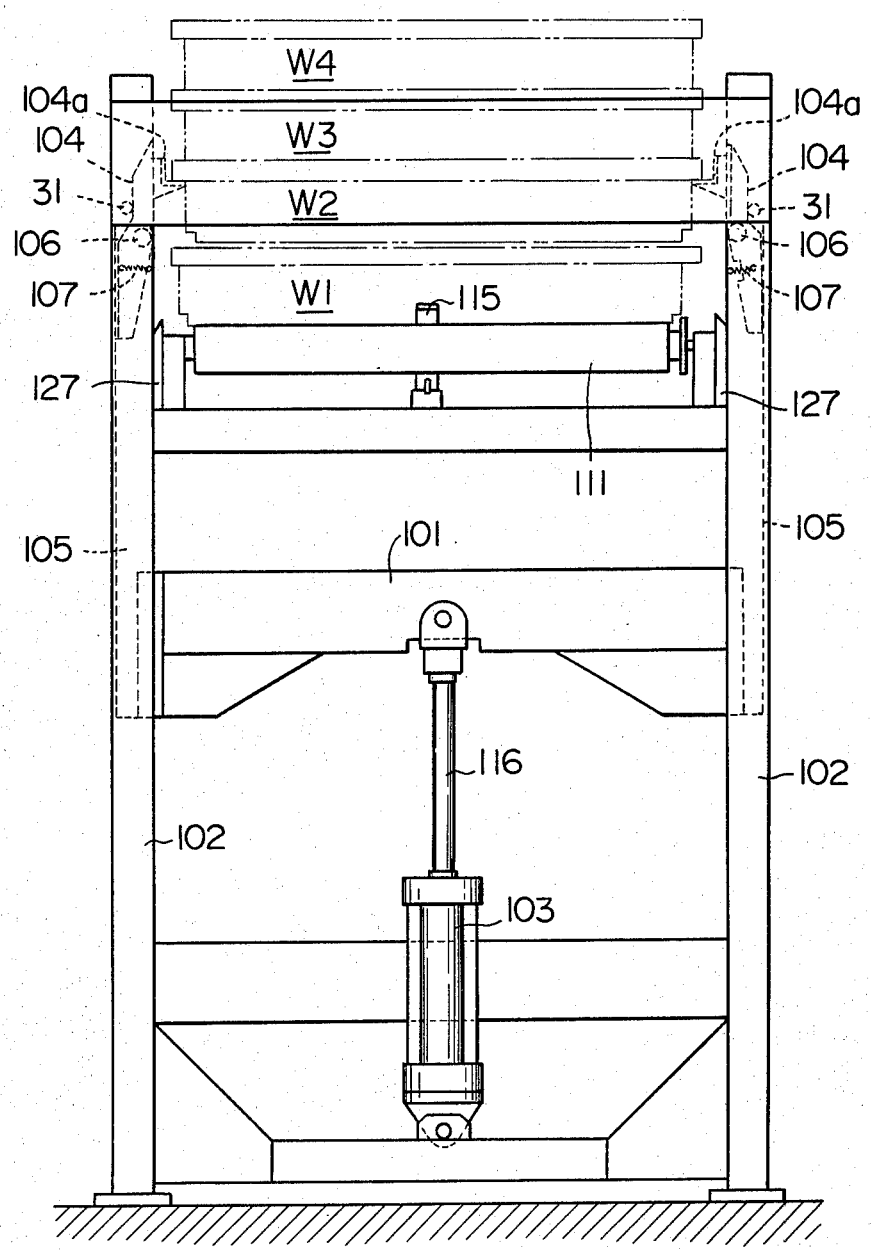
FIG. 5 is a front view diagrammatically illustrating the structure of another embodiment of the present invention.

Referring to FIG. 5, a lift stand 101 is moved in the vertical direction along ]-shaped stanchions 102 by a fluid cylinder 103 as a driving source. Supporting members 105 for supporting thereon hook levers 104 described hereinafter are fixed to both the end portions of the lift stand 101, so that the supporting members 105 are moved in the vertical direction together with the lift stand 101. Each hook lever 104 has a bucket-engaging hook 104a and the intermediate portion of the hook 104 is supported on the supporting member 105 through a shaft 106. A spring 107 is spread between the supporting member 105 and the hook lever 104 below the shaft 106, so that the hook lever 104 is always urged clockwise with the shaft 106 being as the center.

Figure 6:
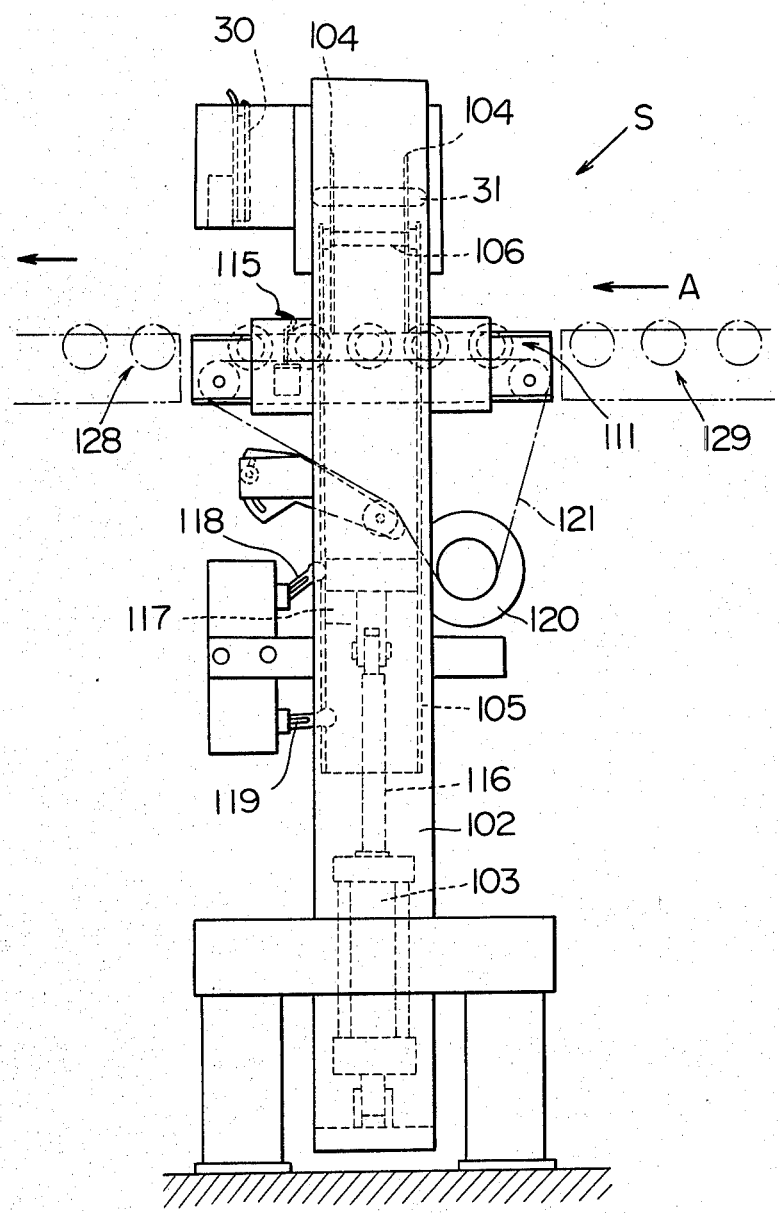
FIG. 6 is a side view showing the apparatus illustrated in FIG. 5.
Figure 7:
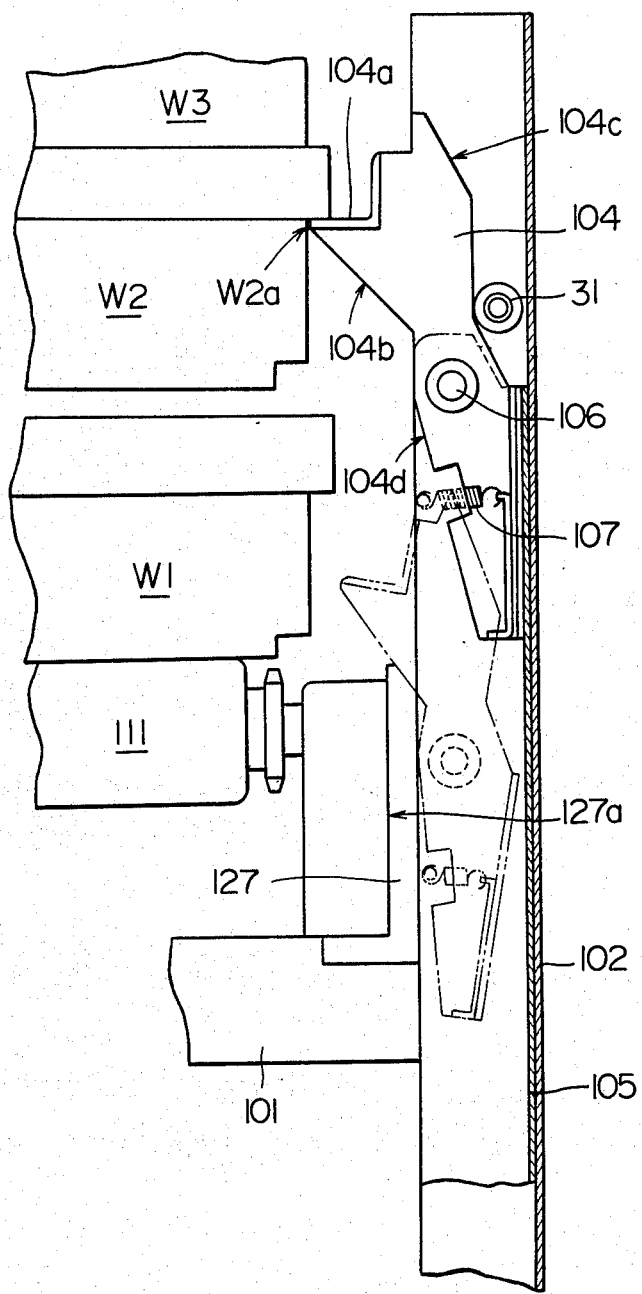
FIG. 7 is a diagram illustrating the operation of the hook lever in a second embodiment.

Referring to FIG. 6, a roller conveyor 111 is laid out between the stanchions 102 and it is driven by a motor 120 through a chain 121. A bucket detecting piece 115 is disposed on the conveyor 111 so that the detecting piece 115 can rise above and sink from the surface of the conveyor 111. A bucket detecting stopper 130 is mounted above the detecting piece 115 to stop buckets at a predetermined position. More specifically, front faces of stacked buckets introduced by a carrying conveyor 129 in a direction indicated by an arrow A impinge against the stopper 130 disposed above the roller conveyor 111 and thus, the buckets are stopped at a predetermined position. A conveyor 128 is disposed to deliver out an individual bucket separated from the stacked buckets.

Limit switches 118 and 119 are fixed to the stanchion 102 at upper and lower two positions, respectively, so that they fall in engagement with a dog 117 of the lift stand 101 moving in the vertical direction along the stanchion 102 to control the operation and stoppage.

A stop plate 127 for stopping the turning movement of the hook lever 104 is fixed on the inner side of the stanchion 102 shown in FIG. 5, so that the hook lever which is turned by the spring disengaging the hook lever from the bucket when the hook lever is brought down is stopped at the position of said stop plate. Hook lever push-out shafts 31 are fixed to the stanchions 102 to push out the hook lever 104 arriving at the position of the second stage so that the hook lever 104 is caused to fall in engagement with the bucket.

Referring to FIG. 6, stacked buckets transported in a direction indicated by an arrow A are transferred onto the roller conveyor 111 of the departing apparatus S and fall in butting contact with the stopper 130. When the motor 120 is stopped, the operation of the fluid cylinder 103 located below is initiated, and with an advance of the piston rod 116, the lift stand 101 and the supporting member 105 fixed to the lift stand 101 are lifted up. Referring to FIG. 7, with elevation of the supporting member 105, the hook lever 104 supported on the supporting member 105 through the shaft 106 is brought up from the position indicated by a two-dot chain line, and the hook lever 104 passes through the lowermost bucket W1 and further rises while the cam face 104C of the hook lever 104 is pressed to the shaft 31 fixed to the stanchion 104 by the spring 107. By this pressing contact between the cam face 104C and the shaft 31, the hook lever 104 is turned counterclockwise with the shaft 106 being as the center against the spring 107 and is allowed to fall in engagement with an engaging portion W2a of a bucket W2. By further elevation of the supporting member 105 and hook lever 104, the bucket W2 is lifted up to a position where it is separated from the lowermost bucket W1.

In the state where the bucket W2 of the second stage is thus separated from the lowermost bucket W1, the dog 117 of the lift stand 101, shown in FIG. 6, puts on the upper limit switch 118 to stop the operation of the fluid cylinder 103. Subsequently, the motor 120 is driven to turn the roller conveyor 111, and by this rotation of the roller conveyor 111, the lowermost bucket W1 on the conveyor 111 is departed and delivered out onto the conveyor 128. At this point, the detecting piece 115 mounted on the roller conveyor 111 detects delivery of the bucket from the conveyor 111 to actuate the fluid cylinder 103 to retract the piston rod 116, whereby buckets of the second and upper stages, which have been lifted up, are brought down and the bucket W2 of the second stage is placed on the roller conveyor 111. When the lift stand 101 is further brought down, the hook lever 104 shown in FIG. 7 is brought down below the engaging face of the bucket, and therefore, the hook lever 104 is turned clockwise with the shaft 106 being as the center by the spring 107 and stopped at the position where the face 104d of the hook lever 104 falls in butting contact with the vertical face 127a of the stop plate 127. Thus, the hook lever 104 is disengaged from the bucket.

At the position where the hook lever 104 is disengaged from the bucket W2, the dog 117 of the lift stand 101 kicks the lower limit switch 119 shown in FIG. 6 to stop driving of the fluid cylinder 103.

In the above-mentioned manner, only the lowermost bucket is separated from the stacked buckets of the second and upper stages and is departed and delivered out. As will be apparent from the foregoing illustration, in the apparatus of the second embodiment of the present invention, the hook lever supported on the supporting member moving in the vertical direction is engaged with and disengaged from the bucket only by the vertical movement of the lift stand by virtue of the cam face formed on the hook lever, the lever push-out shaft 31 disposed on the side of the stanchion at the elevated position and the lever returning spring 107 located at the brought-down position. Furthermore, since the hook lever push-out shaft 31 is disposed at the position of the bucket of the second stage, the hook lever is projected after it has passed through the lowermost bucket. Accordingly, buckets of the second and upper stages can be lifted up in the state engaged with the hook lever while only the bucket of the lowermost stage is left on the roller conveyor. Therefore, according to the second embodiment, one bucket can be separated and delivered out very easily only by the vertical movement of the supporting member having a very simple structure without using a complicated gripping mechanism.

Of course, the hook lever can be engaged with other bucket, for example, a buckets of the third stage or fourth stage, by appropriately setting the position of attachment of the push-out shaft.

What is claimed is:

1. An apparatus for stacking conveyed objects comprising a short conveyor arranged between a carrying conveyor and a delivering conveyor for receiving objects to be stacked from the carrying conveyor stanchions positioned on both sides of the short conveyor, a lift stand arranged under the short conveyor movable in a vertical direction along the stanchions supporting members secured to the lift stand for movement along the stanchions in a vertical direction together with the lift stand, shafts extending parallel to the short conveyor secured to the supporting members, hook levers having upper and lower ends extending generally vertically in the direction of the stanchions pivoted centrally of the levers on the shafts for rotation about the sahfts, spring means secured to the lower ends of the hook levers away from the short conveyor and the upper end of the hook levers toward the short conveyor, an object engaging notch in the upper end of the hook levers, a camming surface on the short conveyor side of the upper end of the hook levers and stop plates positioned substantially at the level of the short conveyor for engaging the camming surface on the hook levers to move the bottom of the hook levers toward the short conveyor on movement downwardly of the lift stand, supporting members and hook levers, whereby on movement upwardly of the lift stand the upper part of the hook levers rotate toward the short conveyor on disengagement of the cam surface from the stop plates to engage an object positioned on the short conveyor in the hook lever object engaging notches to lift the object above the short conveyor and on downward movement of the lift stand the lower ends of the hook levers are again moved toward the short conveyor by the stop plates to disengage the hook levers from objects positioned on the short conveyor, a stop lever pivotally mounted on one of the stanchions adjacent the short conveyor for pivotal movement into an out of the path of an object positioned on the short conveyor and an actuating link pivotally secured to the lever and carried by the lift stand for vertical movement therewith to pivot the stop lever into the path of an object on the short conveyor on movement of the lift stand vertically upwardly and to pivot the stop lever out of the path of a bucket moving on the short conveyor on movement of the lift stand vertically downwardly, including a lost motion connection between the actuating link and lift stand whereby actuation of the stop lever is accomplished during the last portion of movement of the lift stand in either direction.

2. An apparatus for stacking conveyed objects comprising a short conveyor arranged between a carrying conveyor and a delivering conveyor for receiving objects to be stacked from the carrying conveyor, stanchions positioned on both sides of the short conveyor, a lift stand arranged under the short conveyor, movable in a vertical direction along the stanchions, supporting members secured to the lift stand for movement along the stanchions in a vertical direction together with the lift stand, shafts extending parallel to the short conveyor secured to the supporting members, hook levers having upper and lower ends extending generally vertically in the direction of the stanchions pivoted centrally of the levers on the shafts for rotation about the shafts, spring means secured to the lower ends of the hook levers biasing the lower ends of the hook levers away from the short conveyor, an object engaging notch in the upper end of the hook levers, a camming surface on the short conveyor side of the upper end of the hook levers, stop plates positioned substantially at the level of the short conveyor for engaging the camming surface on the hook levers to move the lower ends of hook levers toward the short conveyor on movement downwardly of the lift stand, supporting members and hook levers, whereby on movement upwardly of the lift stand the upper ends of the hook levers rotate toward the short conveyor on disengagement of the cam surface from the stop plates to engage an object positioned on the short conveyor in the hook lever object engaging notches to lift the object above the short conveyor and on downward movement of the lift stand the lower ends of the hook levers are again moved toward the short conveyor by the stop plates to disengage the hook levers from objects positioned on the short conveyor and a stop lever pivotally mounted on one of the stanchions adjacent the short conveyor for pivotal movement into an out of the path of an object positioned on the short conveyor and an actuating link pivotally secured to the lever and carried by the lift stand for vertical movement therewith to pivot the stop lever into the path of an object on the short conveyor on movement of the lift stand vertically upwardly and to pivot the stop lever out of the path of a bucket moving on the short conveyor on movement of the lift stand vertically downwardly.

3. Structure as set forth in claim 2, and further including limit switches operably associated with the lift stand to engage the lift stand in its upper and lower extremes positions and means for stoping movement of the lift stand in response to engagement of the limit switches with the lift stand.

4. Structure as set forth in claim 2, and further including a limit switch secured to a stanchion and positioned over the short conveyor for engaging objects stacked on the short conveyor for providing and indication of the height of the stack of objects.

5. Structure as set forth in claim 2, and further including a limit switch positioned on the short conveyor for sensing the presence of an object on the short conveyor.

* * * * *